(12) United States Patent
Herslow et al.

(10) Patent No.: US 9,898,699 B2
(45) Date of Patent: Feb. 20, 2018

(54) SMART METAL CARD WITH RADIO FREQUENCY (RF) TRANSMISSION CAPABILITY

(71) Applicant: COMPOSECURE, LLC, Somerset, NJ (US)

(72) Inventors: John Herslow, Scotch Plains, NJ (US); Adam Lowe, Hillsborough, NJ (US); Luis Dasilva, Bridgewater, NJ (US)

(73) Assignee: Composecure, LLC, Somerset, NJ (US)

(*) Notice: Subject to any disclaimer, the term of this patent is extended or adjusted under 35 U.S.C. 154(b) by 0 days.

(21) Appl. No.: 14/977,553

(22) Filed: Dec. 21, 2015

(65) Prior Publication Data

US 2016/0180212 A1    Jun. 23, 2016

Related U.S. Application Data

(60) Provisional application No. 62/095,901, filed on Dec. 23, 2014.

(51) Int. Cl.
| | | |
|---|---|---|
| G06F 19/00 | (2011.01) | |
| G06K 19/077 | (2006.01) | |
| H01Q 1/52 | (2006.01) | |
| H01Q 1/22 | (2006.01) | |
| H01Q 7/06 | (2006.01) | |
| G06K 19/02 | (2006.01) | |

(52) U.S. Cl.
CPC ....... *G06K 19/07773* (2013.01); *G06K 19/02* (2013.01); *G06K 19/07771* (2013.01); *H01Q 1/2225* (2013.01); *H01Q 1/526* (2013.01); *H01Q 7/06* (2013.01)

(58) Field of Classification Search
CPC ........ H01Q 7/00; H01Q 1/2225; H01Q 1/243; H01Q 7/06; H01Q 1/38; H01Q 1/526; H01Q 17/004; H01Q 1/22; H01Q 1/2283; G06K 19/07794; G06K 19/07722; G06K 19/02; B32B 2425/00; B32B 38/06; Y10T 156/10
USPC ................................. 235/385, 492
See application file for complete search history.

(56) References Cited

U.S. PATENT DOCUMENTS

| | | |
|---|---|---|
| 4,579,754 A | 4/1986 | Maurer et al. |
| 5,316,791 A | 5/1994 | Farber et al. |
| 6,644,552 B1 | 11/2003 | Herslow |
| 7,287,704 B2 | 10/2007 | Herslow |
| 8,640,965 B2 | 2/2014 | Sutera |

(Continued)

FOREIGN PATENT DOCUMENTS

| | | |
|---|---|---|
| KR | 1020040104545 | 12/2004 |
| WO | 2014126960 A1 | 8/2014 |
| WO | 2016073473 A1 | 5/2016 |

OTHER PUBLICATIONS

International Search Report and Written Opinion of the International Searching Authoirty for International Application No. PCT/US2015/067219, dated Feb. 25, 2016, 8 pages.

(Continued)

*Primary Examiner* — Thien M Le
(74) *Attorney, Agent, or Firm* — RatnerPrestia

(57) ABSTRACT

Ferrite material utilized in a smart metal card as a shield between a metal layer and an antenna does not occupy a complete layer. Instead, only sufficient ferrite material is utilized to track and conform to the antenna.

27 Claims, 7 Drawing Sheets

(56) References Cited

U.S. PATENT DOCUMENTS

| | | |
|---|---|---|
| 8,672,232 B2 | 3/2014 | Herslow |
| 8,725,589 B1 | 5/2014 | Skelding et al. |
| 8,944,810 B2 | 2/2015 | Herslow |
| 9,016,591 B2 | 4/2015 | Herslow et al. |
| 9,390,363 B1 | 7/2016 | Herslow et al. |
| 9,390,366 B1 | 7/2016 | Herslow et al. |
| 9,542,635 B2 | 1/2017 | Herslow |
| 9,569,718 B2 | 2/2017 | Herslow |
| 2006/0172136 A1 | 8/2006 | Komori et al. |
| 2009/0169776 A1 | 7/2009 | Herslow |
| 2011/0020606 A1 | 1/2011 | Herslow et al. |
| 2012/0055013 A1 | 3/2012 | Finn |
| 2013/0140370 A1 | 6/2013 | Finn |
| 2014/0104133 A1* | 4/2014 | Finn ................. G06K 19/07769 343/866 |
| 2014/0209691 A1* | 7/2014 | Finn ................. G06K 19/07769 235/492 |
| 2015/0136856 A1 | 5/2015 | Herslow et al. |
| 2015/0180229 A1* | 6/2015 | Herslow .......... G06K 19/07749 361/56 |
| 2015/0206047 A1* | 7/2015 | Herslow .......... G06K 19/07779 235/492 |
| 2015/0207207 A1* | 7/2015 | Park ....................... H01Q 1/243 343/702 |
| 2015/0339564 A1* | 11/2015 | Herslow ................. B32B 33/00 235/488 |
| 2015/0349424 A1* | 12/2015 | Hur ......................... H01Q 7/06 343/788 |

OTHER PUBLICATIONS

Non Final Office Action for U.S. Appl. No. 14/178,436, dated Nov. 29, 2017, 24 pages.

\* cited by examiner

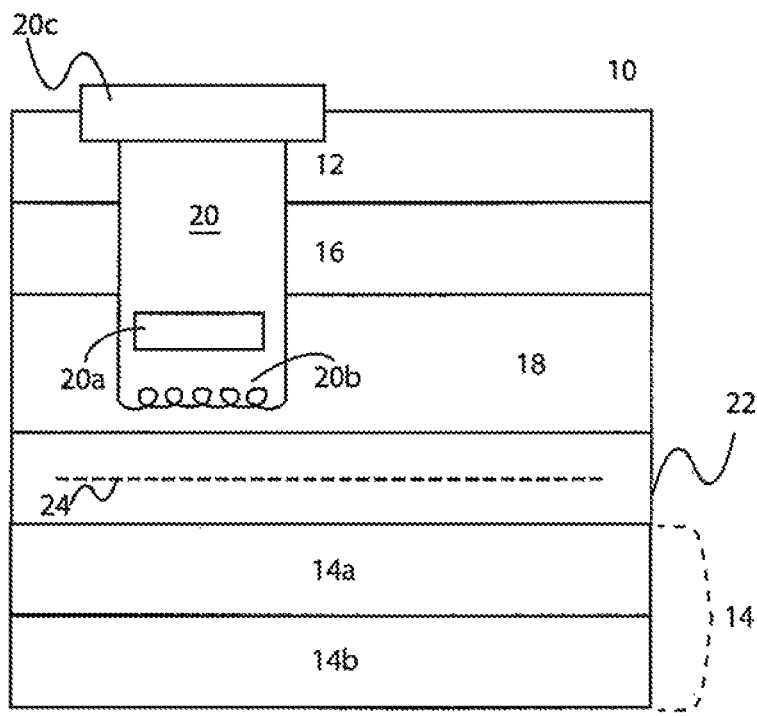
FIG. 1 - PRIOR ART
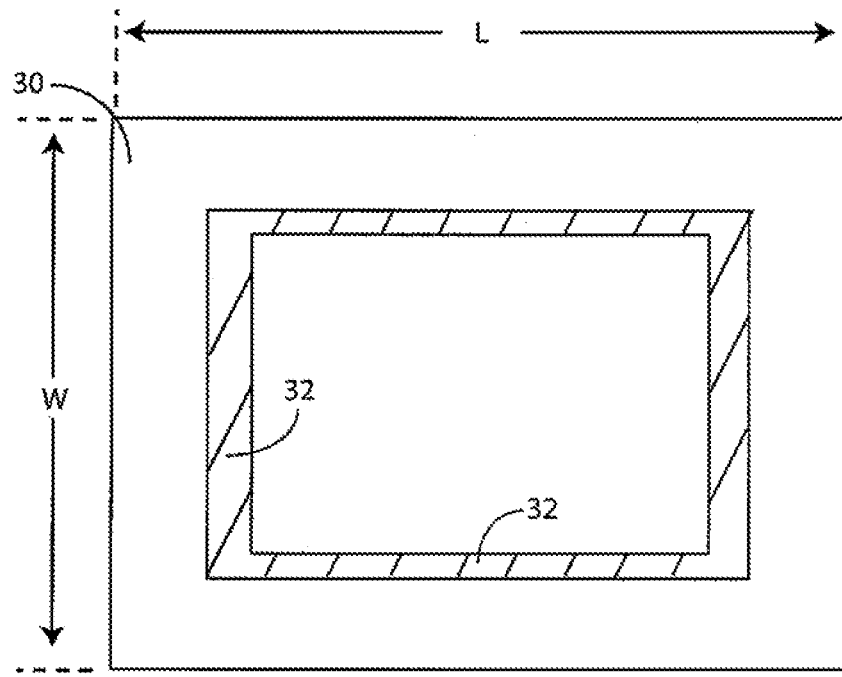
FIG. 2

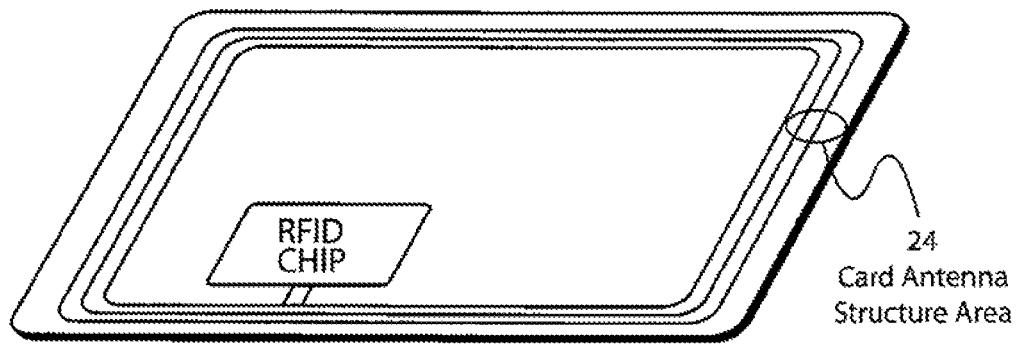
FIG. 3E
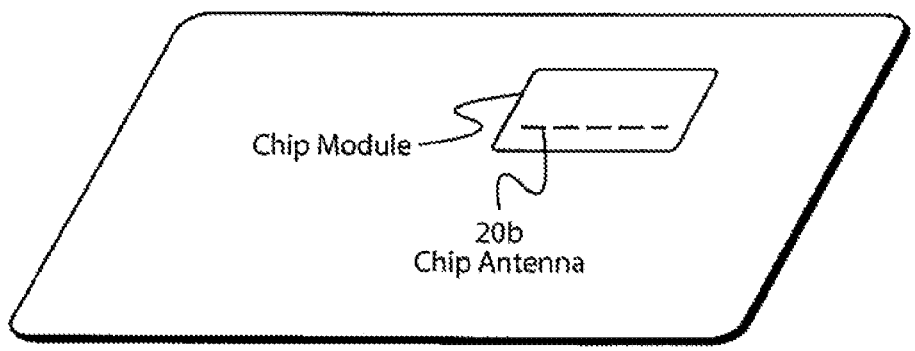
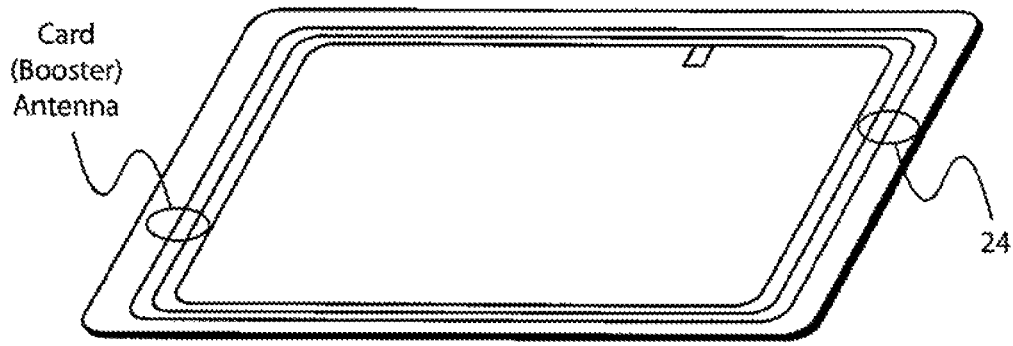
FIG. 3F ized to track and conform
SMART METAL CARD WITH RADIO FREQUENCY (RF) TRANSMISSION CAPABILITY This application claims priority based on a provisional application titled METAL CARD WITH RF TRANSMISSION CAPABILITY (FERRITE STRIP) bearing Ser. No. 62/095,901 filed Dec. 23, 2014.

BACKGROUND OF THE INVENTION

The present invention relates generally to "smart" cards and, more particularly, relates to a smart card which has at least one metal layer and is capable of radio frequency (RF) transmission.

A "smart" card is a card that includes an embedded electronic chip which contains memory and/or a microprocessor and associated electronic circuitry that stores and transacts data. The card data is transacted via a card reader that is part of a computing system.

Smartcards may be of three general types: (a) "contactless", (b) "contact", and (c) "dual interface." A contactless smartcard includes an antenna by means of which RF signals are coupled between the smart card's electronic chip and an antenna of a card reader. That is, there is no direct electrical connection or contact between the card and the card reader. A contact type smart card has contacts which enable a direct electrical connection to be made between an electric chip on the card and a card reader. A dual interface smartcard has the antennas and the direct electrical contacts of the contactless and contact smart cards, so that it may operate as either a contactless or a contact smart card.

Typically, contactless and dual interface smart cards do not have an internal power source. Instead, their card antenna captures some of the RF interrogation signals emanating from the card reader, which the chip rectifies to power the card's electronic.

Contactless smart cards are becoming increasingly popular and are now finding wide use, including: in payment and ticketing applications, such as mass transit and motorway tolls; in personal identification and entitlement schemes on regional, national, and international levels; in citizen cards; in drivers licenses; in patient card schemes; and in biometric passports to enhance security for international travel.

It has become very desirable and fashionable to make cards with one or more metal layers. A metal layer provides a decorative pattern and/or reflective surface enhancing the card's appearance and aesthetic value. This is especially desirable for use by high-end customers. However, a problem arises when using a metal layer with a contactless smart card, in that the metal layer interferes with radio-frequency (RF) communication signals between the card and the reader, and it could render the contactless smart card useless.

As shown in FIG. 1, prior art contactless smart cards with metal layers have used a layer 16 of ferrite material between a metal layer 12 and the internal antenna 22 of the card to shield the antenna from the deleterious effect of the metal layer. However, the ferrite layer tends to be relatively heavy, making the smart card too heavy, and the ferrite material is quite expensive. It is therefore desirable to provide a contactless smart card having a metal layer, in which card the amount of ferrite material is substantially reduced. Note: For purpose of showing a broader use of the smart cards of the invention, FIG. 1 and other figures show the cards to include a module 20 with a contact pad 20c to provide dual interface capability (i.e., contactless as well as contact operation). However, it should be understood that the problem with the ferrite layer is due primarily to the contactless (RF) operation.

It is therefore an object of the present invention to reduce substantially the amount of ferrite material utilized in a smart card with a metal layer. This is the case whether the smart card is designed to have contactless or dual interface capability.

SUMMARY OF THE INVENTION

In accordance with the present invention, ferrite material utilized in a smart card as a shield between a metal layer and an antenna does not occupy a complete layer. Instead, only sufficient ferrite material is utilized to track and conform substantially to the antenna.

In one embodiment, grooves (e.g., 32 in FIG. 2) are formed in a metal substrate (layer) corresponding to the intended shape of the coils (windings) of a booster antenna formed on a plastic layer. The grooves are coated with a ferrite material to provide an RF shield between the metal substrate and the antenna coils which are wholly or partially fitted within the grooves.

In another embodiment, the coils are formed within a plastic layer and the grooves, which are formed in the metal layer to correspond to the shape of the coils, are filled with ferrite material to provide an RF shield.

In a still further embodiment, the coils of a booster antenna may be formed on, or within, a plastic layer. Ferrite material is formed or placed substantially only over the coil layout area to provide an RF shield and a metal layer can then be attached over the shielded coils to form a smart metal card with a limited amount of ferrite material.

In a still further embodiment, smart dual in line metal cards are formed requiring a limited amount of ferrite material.

BRIEF DESCRIPTION OF THE DRAWINGS

The foregoing brief description and further objects, features, advantages of the invention will be understood more completely from the following detailed description of presently preferred, but nonetheless illustrative, embodiments in accordance with the present invention, with reference being had to the accompanying drawings in which:

FIG. 1 is a simplified, partial cross-sectional view of a prior art contactless/dual interface smart "metal" card 10 with a metal layer 12;

FIG. 2 is a plan view illustrating a step in forming a smart "metal" card in accordance with the present invention;

FIGS. 3E and 3F are exploded views showing different possible layouts of a chip module and a card antenna in cards embodying the invention;

DETAILED DESCRIPTION OF THE PREFERRED EMBODIMENTS

Figure 3:
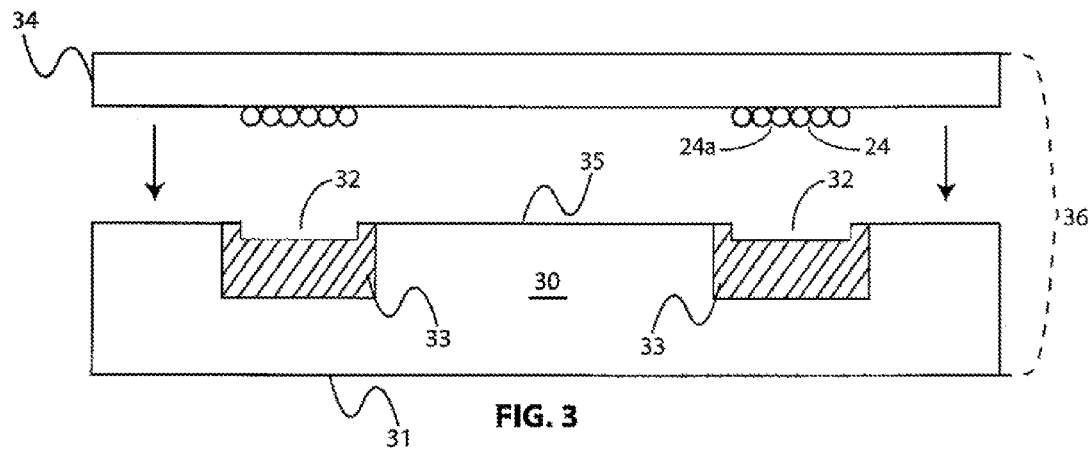
FIG. 3 is a partial cross-sectional view of substrate 30 of FIG. 2.

Turning now to the drawings, FIG. 1 is a simplified partial cross-sectional diagram of a prior art contactless/dual interface smart card 10 with a metal layer 12. A ferrite layer 16 is provided below the metal layer 12 to act as a shield to prevent metal layer 12 from interfering with radio frequency (RF) radiation to and from the smart card. A layer 18 is formed below ferrite layer 16. Layer 18 includes an embedded module 20, which contains a microprocessor chip 20a and a chip antenna 20b coupled to chip 20a. Modules such as module 20 are commercially available, for example, from NXP, SMARTRAC, Infineon, or Inside Secure.

Below layer 18, a layer 22 contains an embedded card antenna 24. Card antenna 24 is designed to capture radio frequency (RF) energy generated by an associated card reader (not shown) and to communicate with the card reader. By design, chip antenna 20b is sufficiently close to couple inductively with antenna 24, thereby coupling signals between antenna 24 and chip 20a, while keeping the chip from making a physical electrical connection with antenna 24.

In operation, ferrite layer 16 shields metal layer 12, to make it possible for radio frequency radiation to enter and be emitted from card 10. Unfortunately, the ferrite layer 16 is heavy and very expensive, making the construction impractical for many applications. The present inventors have found that it is not necessary to provide a full layer of ferrite material to shield the card antenna and/or the chip antenna from metal layer 12. It is only necessary to provide sufficient ferrite material to conform substantially to and track antenna 24.

Layer 14, comprised of sublayers 14a and 14b shown below layer 22, is intended to indicate that additional layers may be used to form card 10.

Reference will now be made to FIGS. 2 and 3. FIG. 2 is a plan view illustrating a step in forming a smart card in accordance with the present invention. A metal layer 30, of width, W, and length, L, may, for example, be about 0.03 inches thick. The metal layer 30 (which may also be referred to as the substrate) is formed with a channel (groove) 32. Channel 32 is formed in the intended shape of antenna 24 (see, for example, FIGS. 3E and 3F) by engraving (scribing) metal substrate 30 via mechanical means which include, for example, milling, forming, stamping and die cutting, or by means of a laser, or chemical etching.

FIG. 3 includes a sectional view of metal substrate 30 having an exterior (outer) surface 31 and an inner surface 35. After groove 32 is formed on the inner surface 35, ferrite material 33 and an adhesive such as epoxy, cyanoacrylate, silicone based system or thermoplastic adhesive are applied into the channel defined by the groove 32. The ferrite 33 may be applied as a die cut sheet or as a ferrite slurry acrylic oligomer intermediate which will harden under UV exposure or after the slurry solvent is driven off. It should be noted that the ferrite 33 is preferably applied so as to be below the inner surface (e.g., 35 in FIG. 3) of the substrate 30 and to rise up to the surface (e.g., 35 of layer 30) of the card at the edges of groove 32. Note the antenna wires cannot be completely encased or completely shielded by the ferrite layer. That is the ferrite shield cannot completely surround the antenna.

A plastic layer 34 which has an antenna 24 mounted on it in the form of windings 24a is then secured over substrate 30, preferably by bonding or any suitable means. Layer 34 may be made, for example, of PVC or polyester and may, for example, range between 0.001 and 0.015 inches thick. Windings 24a (also referred to herein and in the appended claims as coils) may, for example, range between 80 to 120 microns in diameter and may be secured to layer 34 by ultrasonic welding or heating the wire prior to placing it in contact with the plastic layer. It will be appreciated that groove 32 is filled with ferrite to a level sufficiently below the top horizontal surface of substrate 30 to allow windings 24 to be flush with the horizontal surface of substrate 30. This forms a card subassembly 36 [Note that wound antennas are shown and discussed herein but that etched antennas could also be used in cards embodying the invention.]

Figure 4:
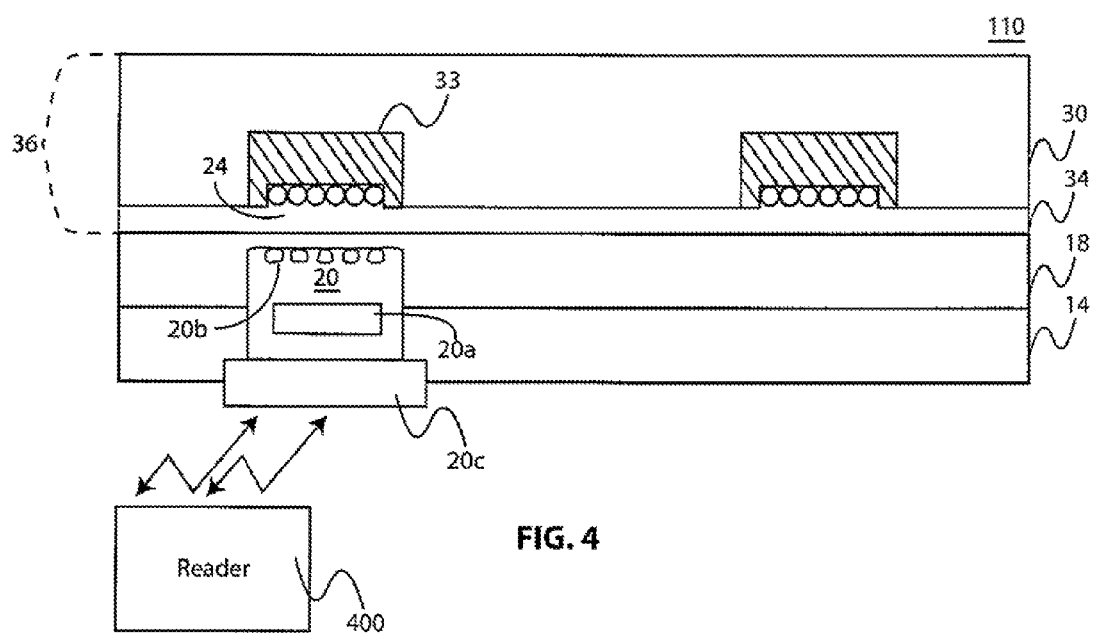
FIG. 4 is a simplified, partial cross-sectional view of a contactless/dual interface smart card 110 incorporating subassembly 36 of FIG. 3.

FIG. 4 is a simplified partial cross-sectional view of a contactless/dual interface smart card 110 incorporating subassembly 36. FIG. 4 should be compared to FIG. 1. Subassembly 38 (inverted compared to FIG. 3) provides a metal layer 30 for smart card 110 and contains the ferrite shield 33 overlying card (booster) antenna 24. A layer 18 is formed below subassembly 36. Layer 18 contains and includes a module 20, which contains a microprocessor chip 20a and a chip antenna 20b coupled to chip 20a This layer 18 is comparable to layer 18 in FIG. 1. The layer 14 is intended to indicate that there may be additional layers in the smart card 110 which are not detailed. In FIG. 4 direct contact to a reader 400 is made via a card contact pad 20c. Note that contact pad 20c is on the opposite side of the metal substrate. Contactless reading between the reader 400 and the card is also possible via RF communication between reader 400 and the antennas coupling to the chip 20a.

In operation, ferrite material 33 deposited in groove 32 shields antenna 24 (and chip antenna 20b) from metal substrate 30, to make it possible for RF radiation to enter and be emitted from antenna 24. However, the amount of ferrite utilized has been substantially reduced in comparison to FIG. 1, resulting in substantial reductions in weight and cost. However, a sufficient amount of the ferrite material remains for its weight to make the smart card feel substantial. In part, the reduction in ferrite material has been made possible because the antenna is located in grooves formed in the metal card and the ferrite material forms a shield between the antenna and the metal. A metal surface interferes with RF radiation in that it absorbs incident RF signals with the metal acting as a virtual ground. The ferrite layer formed between the card antenna 24 (including chip antenna 20b) and the metal layer 30 reflects incident RF signals so they are not absorbed by the metal layer. Note that reader 400 is shown positioned to interrogate the smart card from the non-metallic side of the card for contactless operation.

FIGS. 3A, 3B, 3C and 3D are cross sectional diagrams of possible smart metal cards with ferrite shields formed between the card/chip antennas (24 and 20b) and the cards' metal layer (30) in accordance with the invention.

Figure 3A:
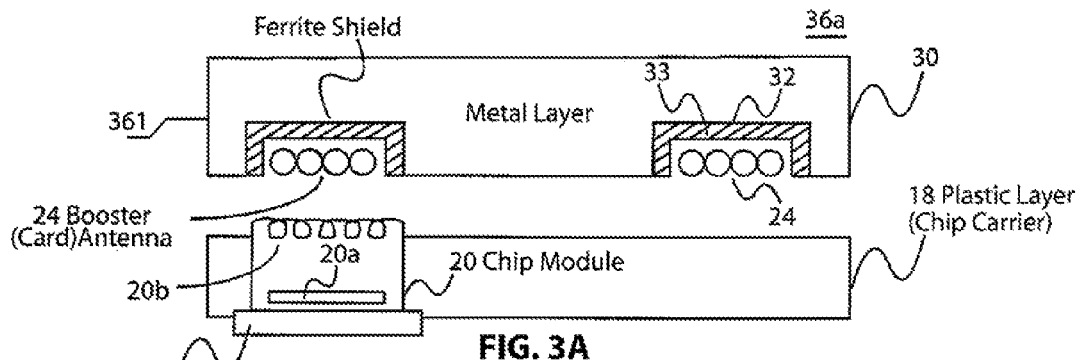
FIGS. 3A, 3B, 3C and 3D are cross sectional diagrams of different smart metal cards with ferrite shields formed between the card and chip antennas and the cards metal layer in accordance with the invention.

FIG. 3A is similar to the structure shown in FIG. 4 except that the layer 34 has been eliminated. In this embodiment, the subassembly 36a includes a metal substrate 361 and a plastic chip carrier layer 18. The metal layer 361 is shown with a ferrite shield 33 attached to the groove 32 and with a booster card antenna 24 formed (wound) directly within the ferrite shielded groove.

Figure 3B:
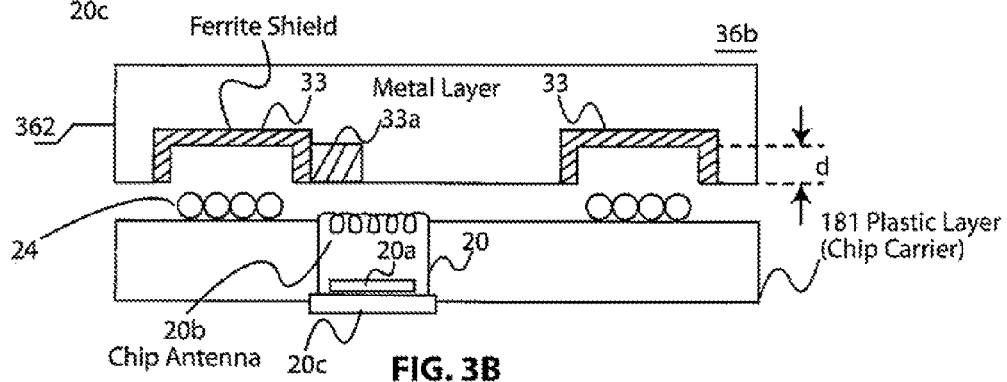

FIG. 3B is directed to a smart metal card in which the antenna and chip module are offset with respect to each other corresponding to the layout shown in FIG. 3E. In this embodiment the subassembly 36b includes a metal substrate 362 and a plastic chip carrier layer 181. FIG. 3B shows that the metal layer sub-assembly 362 includes a ferrite shield 33 and a ferrite shield extension 33a to shield the space between the chip antenna 20b and the card antenna 24 to improve the RF coupling. The ferrite shield 33 extends a distance "d" from the bottom horizontal edge of the metal layer (as shown in FIG. 3B) to enable the antenna 24 to nestle within the set back space. In this configuration the card antenna 24 is positioned on the plastic layer 181 and the chip module 20 is disposed on, or within, the plastic layer 181 to form a second subassembly which can be fitted to and with the metal layer sub-assembly 362.

Figure 3C:
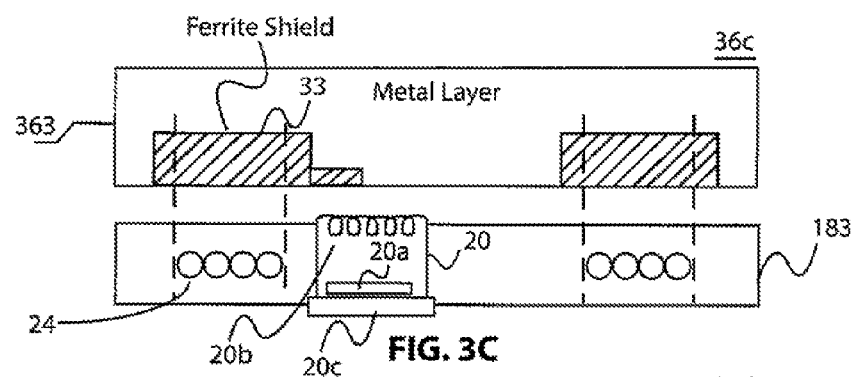

FIG. 3C is directed to a smart metal card which includes a metal substrate 363 and a plastic chip carrier layer 183 to form a sub assembly 36c. The metal layer substrate 363 includes a ferrite shield 33 and a ferrite shield extension 33a to shield the space between the chip antenna 20b and the card antenna 24 to improve RF coupling. In this configuration the ferrite shield 33 may be flush with the bottom horizontal edge of the metal layer (as shown in FIG. 3C). The card antenna 24 is recessed within the plastic layer 183 and the chip module is formed on or within the plastic layer 183 to form a second subassembly which can be fitted to and with the metal layer substrate 363.

Figure 3D:
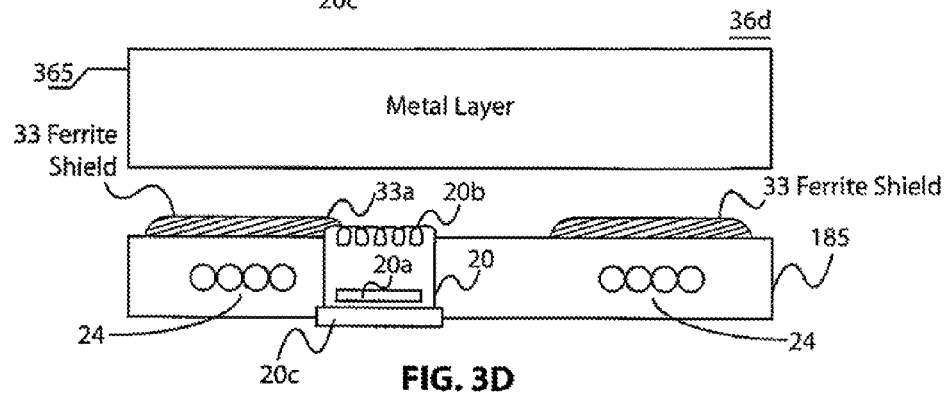

FIG. 3D shows a subassembly 36d which includes a metal substrate 365 and a plastic layer chip carrier assembly 185. FIG. 3D shows that the metal layer 365 can be a metal layer requiring no scribing or engraving. That is, there is no need to form a groove in the metal layer. A second sub-assembly 185 is formed which includes: (a) a ferrite shield 33 to shield a card antenna 24 formed on or within the plastic layer 185; (b) a chip module 20 and chip antenna 20b formed on or within the layer 185; and (c) a ferrite shield extension 33a to shield the chip antenna 20b and its pacing to the card antenna 24 to improve RF coupling. The card antenna 24 and the chip module may be formed as a step in the process of forming a sub-assembly 185 which, after being formed, could be subsequently attached to a metal layer 365. Not having to scribe or engrave the metal layer may be a significant saving in the cost of manufacture.

Referring to FIG. 3E note that the RFID chip and the card antenna can be formed on the same layer or level. This illustrates that a contactless (wireless only) card can be formed so it does not need a separate chip antenna. That is, antenna 24 could be mounted on, or in, a common layer with the RFID chip/module (e.g., 20 in the figures) and its chip could be wired to antenna 24 via conductors provided on the common layer. This would eliminate the need for antenna 20a However, it should be understood that a chip antenna and a card antenna may be formed on the same layer with the antennas being inductively coupled.

Alternatively, as shown in FIG. 3F a card antenna 24 can be formed on, or within, one layer of a card and the chip module can be formed on another layer of the card. In the configurations of FIG. 3E or 3F, the RFID chip can be either directly connected or inductively connected to the card antenna. As already noted above, in smart metal cards embodying the invention only sufficient ferrite martial is used to track and substantially cover the underlying card (booster) antenna and the chip antenna in order to form a shield between the antenna(s) and an overlying metal layer.

Figure 5:
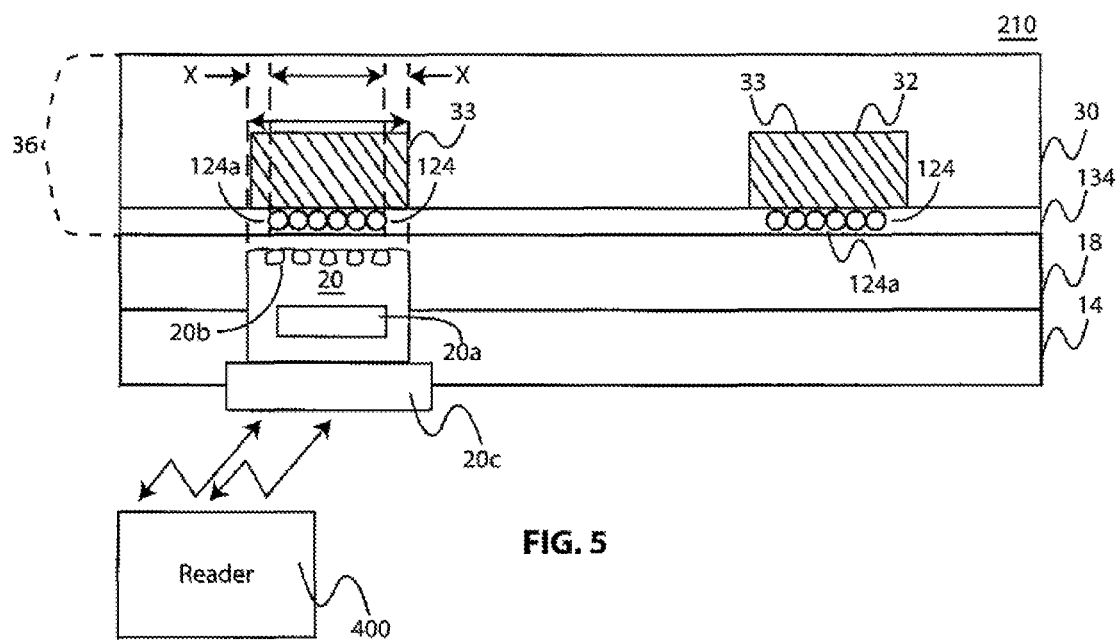
FIG. 5 is a simplified partial cross-sectional view of a contactless/dual interface smart card 210 embodying the invention.

FIG. 5 is a simplified partial cross-sectional view of a dual interface (contact and contactless) smart card 210 embodying the invention. In FIG. 5, a metal substrate 30 has a groove 32 formed in its surface. Groove 32 may be at least 0.0005 inches deep and may be 0.004 inches deep. After groove 32 is formed, ferrite material 33 and an adhesive, as described above, are applied to fill the channel defined by the groove. The ferrite may be applied as a die cut sheet or as a ferrite slurry which wilt harden under UV exposure or after the solvent is driven off. Formed below substrate 30 is a plastic layer 134 having an embedded antenna 124 in the form of windings 124a. A layer 18 is formed below layer 134 and has an embedded module 20, which contains a microprocessor chip 20a and an antenna 20b coupled to chip 20a. This layer 18 is comparable to layer 18 in FIG. 1. In FIGS. 4 and 5 the module 20 and chip 20a are shown to extend through layers 18 and 14. In practice this may not be the case, with the chip 20 being contained within layer 18. The layer 14, as noted above, is intended to indicate that there may be additional layers in the smart card 210 that are not shown.

In FIG. 5, ferrite 33' extends laterally beyond winding 124 by an amount identified as "X" (which may be, for example, at least 0.005 inches) in order to ensure that the metal substrate 30 will not interfere with RF transmission or reception by antenna 124.

It is also be possible to form the ferrite material as in FIG. 5, but in a layer, such as a plastic layer, which is separate from substrate 30.

In operation, ferrite material 33 deposited in groove 32 shields antenna 124 from substrate 30, to make it possible for radio frequency radiation to enter and be emitted from antenna 124. However, the amount of ferrite utilized has been substantially reduced in comparison to FIG. 1, resulting in substantial reductions in cost.

Figure 6:
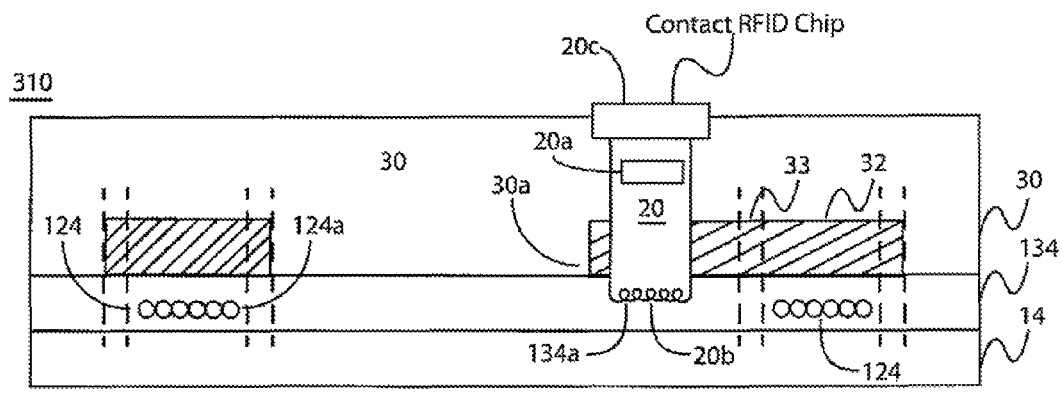
FIGS. 6, 6A and 6B are simplified partial cross-sectional views of a dual interface smart card 310 embodying the invention.
Figure 6A:
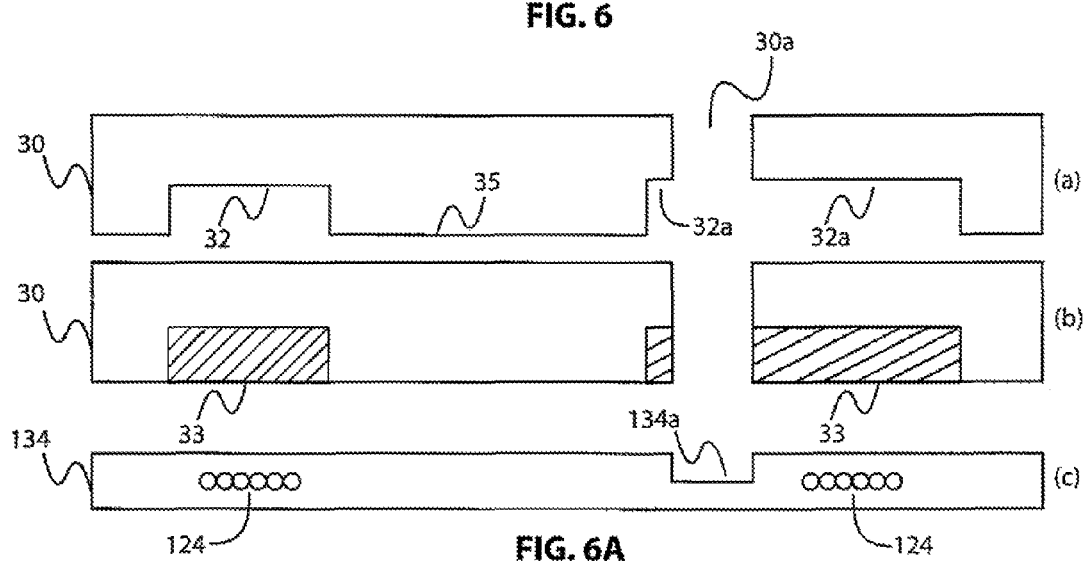
Figure 6B:
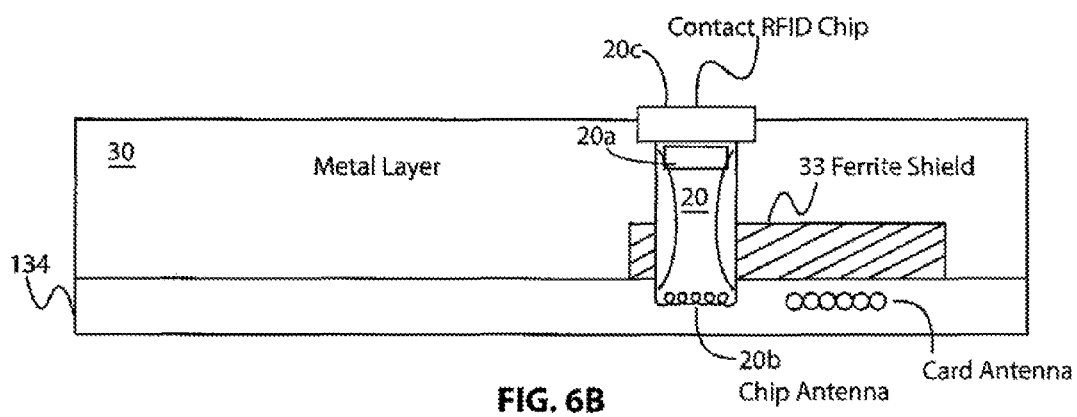

FIG. 6 is a simplified partial cross-sectional view of a dual interface smart card 310 embodying the invention. In this embodiment, the contact pad 20c is on the same side/surface as the exterior (outer) surface of the metal layer 30. FIG. 6A illustrates some steps in forming the card of FIG. 6 and FIG. 6B illustrates a version of FIG. 6. The card antenna 124 is shielded with a ferrite layer like in FIG. 5. However, the structure of FIG. 6 also includes provision for mounting the chip module 20 so the card 310 can function as a contact or a contactless card (i.e., a dual interface card). FIG. 6 includes a metal substrate 30 with a grooves (32, 32a) formed in, and along, its inner surface 35 as detailed in cross section (a) of FIG. 6A. The grooves (32, 32a) may range by way of example, between at least 0.0005 inches deep and 0.004 inches deep. After grooves 32 and 32a are formed, ferrite material 33 and an adhesive are applied to fill the channel defined by the grooves as detailed in cross section (b) of FIG. 6A The ferrite may be applied as a die cut sheet or as a ferrite slurry which will harden under UV exposure or after the solvent is driven off. As shown in FIG. 6A, substrate 30 is formed with a through bore 30a, which is shaped to receive an RFID module 20, which contains a microprocessor chip 20a, an antenna 20b and a contact pad 20c. Pad 20c is a conventional contact pad used in contact-type smart cards and is positioned to engage contacts in a card reader when the smart card is inserted therein. Antenna 20b is shown to project below metal substrate 30, for example, by about 0.01 inch.

Formed below substrate 30 is a plastic layer 134 having an antenna 124 formed by winding the coils (windings) 24a within a plastic layer 134 as shown in the figure. Layer 134 is formed with a recess 134a shaped to receive the portion of antenna 20b that extends below substrate 30 see FIG. 6A). This permits antenna 20b to extend in close proximity to antenna 124. The layer 14 is intended to indicate that there may be additional layers in the smart card 310 that are not shown.

Preferably, the ferrite shield 33 extends laterally beyond winding 124 by at least 0.005 inches, as shown in greater detail in FIG. 6A, in order to ensure that substrate will not interfere with transmission or reception by antenna 124.

In operation, ferrite material 33 deposited in grooves 32, 32a shield antenna 124 from metal substrate 30, to make it possible for radio frequency radiation to enter and be emitted from antenna 124 and for antennas 20b and 124 to communicate effectively. However, the amount of ferrite utilized has been substantially reduced in comparison to FIG. 1, resulting in substantial reductions in cost. With pad 20c available, smart card 310 can also be used as a conventional contact-type smart card.

Figure 7:
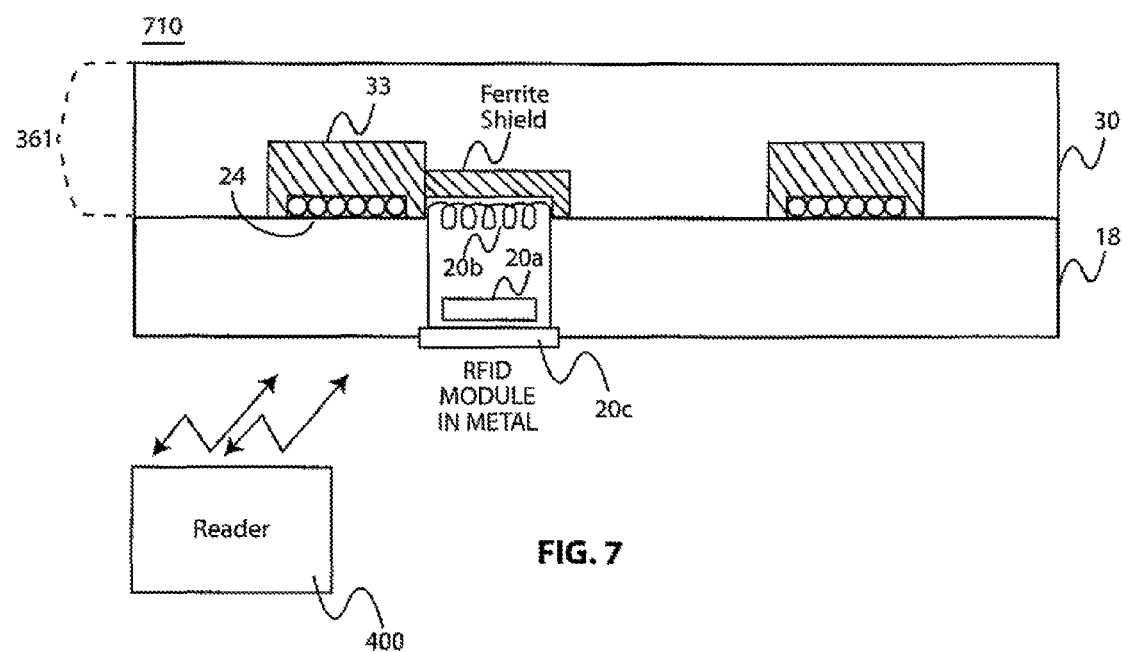
FIG. 7 is a cross-sectional diagram of a contactless/dual interface smart card embodying the invention.

FIG. 7 illustrates that a recess may be formed in the metal substrate 30 to accommodate a card antenna and an RFID module. In this configuration a ferrite shield would be formed over the RFID module and the card antenna to shield the combination from the metal substrate. In this type of configuration the card antenna and the RFID module are positioned within the metal substrate but shielding is provided to enable RE communication between the combination and an RF reader Although preferred embodiments of the invention have been disclosed for illustrative purposes, those skilled in the art will appreciate that many additions, modifications, and substitutions are possible without departing from the scope and spirit of the invention.

The invention is applicable to contactless smart cards and as shown in various of the figures can also be used in the manufacture of dual interface cards.

For wireless communication the reader 400 is positioned to send out interrogating signals toward the non-metallic surface of the card. For the dual interface type card shown in FIG. 6 the reader (not shown) would/could make contact to the chip along the same surface as the metal layer.

To differentiate between the ferrite layer of the prior art which is applied for the full area of a card and the limited application of the ferrite material in accordance with the invention, the ferrite material may be referred as a strip of ferrite metal.

In accordance with the present invention, ferrite material utilized in a smart card as a shield between a metal layer and an antenna does not extend for the full area of the card. Instead, only sufficient ferrite material is utilized to track and conform substantially to the antenna.

What is claimed is:

1. A smart metal card comprising:
   a plastic layer having a top surface;
   a metal layer overlying the plastic layer, said metal layer having an inner surface;
   a groove formed within the inner surface of said metal layer;
   antenna windings disposed within said groove and wound along the top surface of or within said plastic layer; and
   a strip of ferrite material lining said groove and disposed between the inner surface of the metal layer and the antenna windings, said strip of ferrite material overlying the antenna windings and limited to a length and a width sufficient to track the underlying antenna windings to form an RF shield between the antenna windings and the metal layer.

2. A card as claimed in claim 1, wherein the antenna windings are wound in proximity to an outer periphery of the plastic layer.

3. A card as claimed in claim 1, wherein said strip of ferrite material is disposed on the plastic layer so as to overly the antenna windings; and the plastic layer is attached to the inner surface of the metal layer.

4. A card as claimed in claim 1, wherein the plastic layer includes a chip module containing a chip for processing data and a chip antenna for coupling to the card antenna.

5. A card as claimed in claim 4 wherein the strip of ferrite material is disposed to also shield the chip antenna to improve RF communication between the chip module and the card antenna.

6. A card as claimed in claim 1, wherein the length and width of the strip of ferrite material extends in a lateral direction, beyond a vertical projection of the underlying windings to improve the RF shielding between the antenna windings and the metal layer.

7. A card as claimed in claim 1, including a module having a chip and a chip antenna for communicating with the card antenna; wherein the strip of ferrite material is disposed to shield the card antenna and the chip antenna to provide improved RF shielding between the metal layer and the windings of the card antenna and the chip antenna.

8. A card as claimed in claim 1, including a module having a chip and a chip antenna for communicating with the card antenna; and wherein the strip of ferrite material is disposed to shield the card antenna and the chip antenna to provide RF shielding between the metal layer and the windings of the card antenna and the chip antenna.

9. A card as claimed in claim 1, including a chip module providing both contactless and contact capability, and wherein said chip module includes contacts for selectively making direct contact to a card reader.

10. A card as claimed in claim 1, including a chip module containing a chip for processing data and a chip antenna and wherein said card antenna and said chip antenna are on different levels.

11. A card as claimed in claim 1, including a chip module containing a chip for processing data and a chip antenna and wherein said card antenna and said chip antenna are on the same plastic layer.

12. The smart metal card of claim 1, wherein the plastic layer further has a width and a length and the metal layer has a width and a length equal to the width and the length of the plastic layer.

13. The smart metal card of claim 12, wherein the length and the width of the strip of ferrite material conform to the underlying antenna windings.

14. A smart metal card comprising:
   a plastic layer having a top surface;
   a metal layer overlying the plastic layer, said metal layer having an inner surface;
   a groove formed within the inner surface of said metal layer;
   antenna windings disposed within and extending below said groove and wound along the top surface of or within said plastic layer; and
   a strip of ferrite material filling said groove and disposed between the inner surface of the metal layer and the antenna windings, said strip of ferrite material overlying the antenna windings and limited to a length and a width sufficient to track the underlying antenna windings to form an RF shield between the antenna windings and the metal layer.

15. The smart metal card of claim 14, wherein the plastic layer further has a width and a length and the metal layer has a width and a length equal to the width and the length of the plastic layer.

16. The smart metal card of claim 15, wherein the length and the width of the strip of ferrite material conform to the underlying antenna windings.

17. A smart metal card comprising:
a plastic layer having a top surface;
a metal layer overlying the plastic layer, said metal layer having an inner surface;
a groove formed within the inner surface of said metal layer and having a lateral dimension;
antenna windings having a lateral dimension smaller than the later dimension of the groove, the antenna windings disposed within said groove and wound along the top surface of or within said plastic layer; and
a strip of ferrite material lining said groove and disposed between the inner surface of the metal layer and the antenna windings, said strip of ferrite material overlying the antenna windings and limited to a length and a width sufficient to track the underlying antenna windings to form an RF shield between the antenna windings and the metal layer.

18. The smart metal card of claim 17, wherein the plastic layer further has a width and a length and the metal layer has a width and a length equal to the width and the length of the plastic layer.

19. The smart metal card of claim 18, wherein the length and the width of the ferrite material conform to the underlying antenna windings.

20. A smart metal card comprising:
a plastic layer with windings wound around the plastic layer to form a card antenna;
a metal layer overlying the plastic layer, said metal layer having an inner surface; and
a groove formed within the inner surface of said metal layer, said groove filled with a ferrite material disposed over the antenna windings, said strip of ferrite material overlying the antenna windings and limited to a length and a width sufficient to track the underlying antenna windings to form an RF shield between the antenna windings and the metal layer.

21. A smart metal card as claimed in claim 20, wherein said plastic layer has a top surface facing the metal layer and wherein the windings are located along the top surface of said plastic layer.

22. A smart metal card as claimed in claim 20, wherein said plastic layer has a top surface facing the metal layer and wherein the windings are located within the plastic layer.

23. The smart metal card of claim 20, wherein the plastic layer further has a width and a length and the metal layer has a width and a length equal to the width and the length of the plastic layer.

24. The smart metal card of claim 23, wherein the length and the width of the ferrite material conforms to the underlying antenna windings.

25. A method of forming a metal smart card comprising the steps of:
selecting a plastic layer having top and bottom surfaces, a width and a length;
forming a winding along the top surface of the plastic layer or within said plastic layer to form a card antenna;
selecting a metal layer overlying the plastic layer;
forming a groove within the inner surface of said metal layer; and
disposing ferrite material within said groove between the inner surface of the metal layer and the antenna windings and overlying the antenna windings, limiting the ferrite material to a length and a width sufficient to track the underlying antenna windings to form an RF shield between the antenna windings and the metal layer.

26. The method of claim 25, wherein the plastic layer has a width and a length and the metal layer has a width and a length equal to the width and the length of the plastic layer.

27. The method of claim 26, further comprising limiting the length and the width of the ferrite material to conform to the underlying antenna windings.

\* \* \* \* \*